(12) United States Patent
Guidarelli

(10) Patent No.: US 11,196,375 B1
(45) Date of Patent: Dec. 7, 2021

(54) METHODS FOR IMPROVING SPEED OF VELOCITY CONTROL AND POWER EFFICIENCY OF AT LEAST A PARTIALLY RESONANT ACTUATOR SYSTEM AND SYSTEMS THEREOF

(71) Applicant: New Scale Technologies, Inc., Victor, NY (US)

(72) Inventor: Thomas Guidarelli, Farmington, NY (US)

(73) Assignee: NEW SCALE TECHNOLOGIES, INC., Victor, NY (US)

( * ) Notice: Subject to any disclaimer, the term of this patent is extended or adjusted under 35 U.S.C. 154(b) by 0 days.

(21) Appl. No.: 16/922,577

(22) Filed: Jul. 7, 2020

(51) Int. Cl.
*H02P 27/04* (2016.01)
*H02P 25/06* (2016.01)

(52) U.S. Cl.
CPC ............. *H02P 25/06* (2013.01); *H02P 27/04* (2013.01)

(58) Field of Classification Search
CPC .......... H02P 27/08; H02P 27/06; H02P 25/06; H02P 27/04; H02P 27/047
See application file for complete search history.

(56) References Cited

U.S. PATENT DOCUMENTS

| | | | | |
|---|---|---|---|---|
| 8,299,733 B2 * | 10/2012 | Sattler | .................. | H02N 2/0095 318/118 |
| 8,304,960 B2 * | 11/2012 | Sattler | ...................... | H02N 2/14 310/317 |
| 8,450,905 B2 * | 5/2013 | Guidarelli | ................ | H02N 2/14 310/317 |
| 8,466,637 B2 * | 6/2013 | Guidarelli | .............. | G05B 19/40 318/118 |

* cited by examiner

*Primary Examiner* — Thai T Dinh
(74) *Attorney, Agent, or Firm* — Troutman Pepper Hamilton Sanders LLP (Rochester)

(57) ABSTRACT

A method and system that control a driving system to generate driving signals comprising a sequence of full bridge outputs to control an output velocity of at least one at least partially resonant actuator device. The drive system is adjusted to modify a width of one or more pulses of one of the full bridge outputs for a first range of gain or another one of the full bridge outputs for a second range of the gain to less than fifty percent of a period of the fixed drive frequency of the driving signals to achieve a new gain. The adjusted driving signal is provided to the at least one at least partially resonant actuator device.

15 Claims, 8 Drawing Sheets

| Gain (0-100) | 0 | 12.5 | 25 | 37.5 | 50 | 62.5 | 75 | 87.5 | 100 |
|---|---|---|---|---|---|---|---|---|---|
| High Side Pulse Width % | 0 | 0 | 0 | 0 | 0 | 12.5 | 25 | 37.5 | 50 |
| Low Side Pulse Width % | 0 | 12.5 | 25 | 37.5 | 50 | 50 | 50 | 50 | 50 |

| # METHODS FOR IMPROVING SPEED OF VELOCITY CONTROL AND POWER EFFICIENCY OF AT LEAST A PARTIALLY RESONANT ACTUATOR SYSTEM AND SYSTEMS THEREOF

FIELD

This technology relates to methods and devices for improving speed of velocity control and power efficiency of at least a partially resonant actuator system and systems thereof.

BACKGROUND

A variety of effective methods exist for regulating a half or full bridge electrical drive signals to achieve a desired actuator system velocity exist. By way of example, one approach achieves a desired actuator system velocity by regulating a pulse width of a pulse stream being delivered to the actuator (referred to herein as the "PWM method"). An example of this approach is illustrated and described in U.S. Pat. No. 8,450,905 which is herein incorporated by reference in its entirety.

Another approach only applies to full bridge drive signals and achieves a desired actuator system velocity by regulating how often the low side drive signal is activated in a full bridge pulse stream (referred to herein as the "Hybrid method"). An example of this approach is illustrated and described in U.S. Pat. No. 8,299,733 which is herein incorporated by reference in its entirety.

With respect to these approaches, the PWM method effects a change in velocity more rapidly than the Hybrid method because the Hybrid method may require multiple pulses for a change in low side activation frequency to have its desired effect. Meanwhile, because the Hybrid method can reduce the average voltage applied to the actuator, the Hybrid method can be more power efficient than PWM method. Additionally, a further description of this power saving aspect is illustrated and described in U.S. Pat. No. 8,304,960 which is herein incorporated by reference in its entirety. Accordingly, although effective, these prior approaches have not been able to fully achieve a rapid change in actuator system velocity while maximizing power efficiency.

SUMMARY

A method includes controlling, by a computing device, a driving system to generate driving signals comprising a sequence of full bridge outputs to control an output velocity of at least one at least partially resonant actuator device. Operation of the drive system is adjusted, by the computing device, to modify a width of one or more pulses of one of the full bridge outputs for a first range of gain or another one of the full bridge outputs for a second range of the gain to less than fifty percent of a period of the fixed drive frequency of the driving signals to achieve a new gain. The adjusted driving signal is provided to the at least one at least partially resonant actuator device.

A resonant actuator system includes at least one at least partially resonant actuator device, a driving system coupled to the at least one at least partially resonant actuator device, and a computing device coupled to the driving system. The computing device has a memory comprising programmed instructions stored thereon and one or more processors configured to be capable of executing the stored programmed instructions to control the driving system to generate driving signals comprising a sequence of full bridge outputs to control an output velocity of the at least one at least partially resonant actuator device. The operation of the drive system is adjusted to modify a width of one or more pulses of one of the full bridge outputs for a first range of gain or another one of the full bridge outputs for a second range of the gain to less than fifty percent of a period of the fixed drive frequency of the driving signals to achieve a new gain. The driving system is configured to provide the adjusted driving signal to the at least one at least partially resonant actuator device.

A method of making a resonant actuator system includes providing a driving system configured to couple to at least one at least partially resonant actuator device and coupling a computing device to the driving system. The computing device has memory comprising programmed instructions stored thereon and one or more processors configured to be capable of executing the stored programmed instructions to control the driving system to generate driving signals comprising a sequence of full bridge outputs to control an output velocity of the at least one at least partially resonant actuator device. The operation of the drive system is adjusted to modify a width of one or more pulses of one of the full bridge outputs for a first range of gain or another one of the full bridge outputs for a second range of the gain to less than fifty percent of a period of the fixed drive frequency of the driving signals to achieve a new gain. The driving system is configured to provide the adjusted driving signal to the at least one at least partially resonant actuator device.

This technology provides a number of advantages including providing a faster and more power efficient operational velocity control of an at least partially resonant actuator system. In particular, examples of this technology, (referred to herein as the pseudo voltage control (PVC) method) achieve a more rapid change in actuator system velocity than the Hybrid method while being more power efficient than the PWM method.

DETAILED DESCRIPTION

Figure 1A:
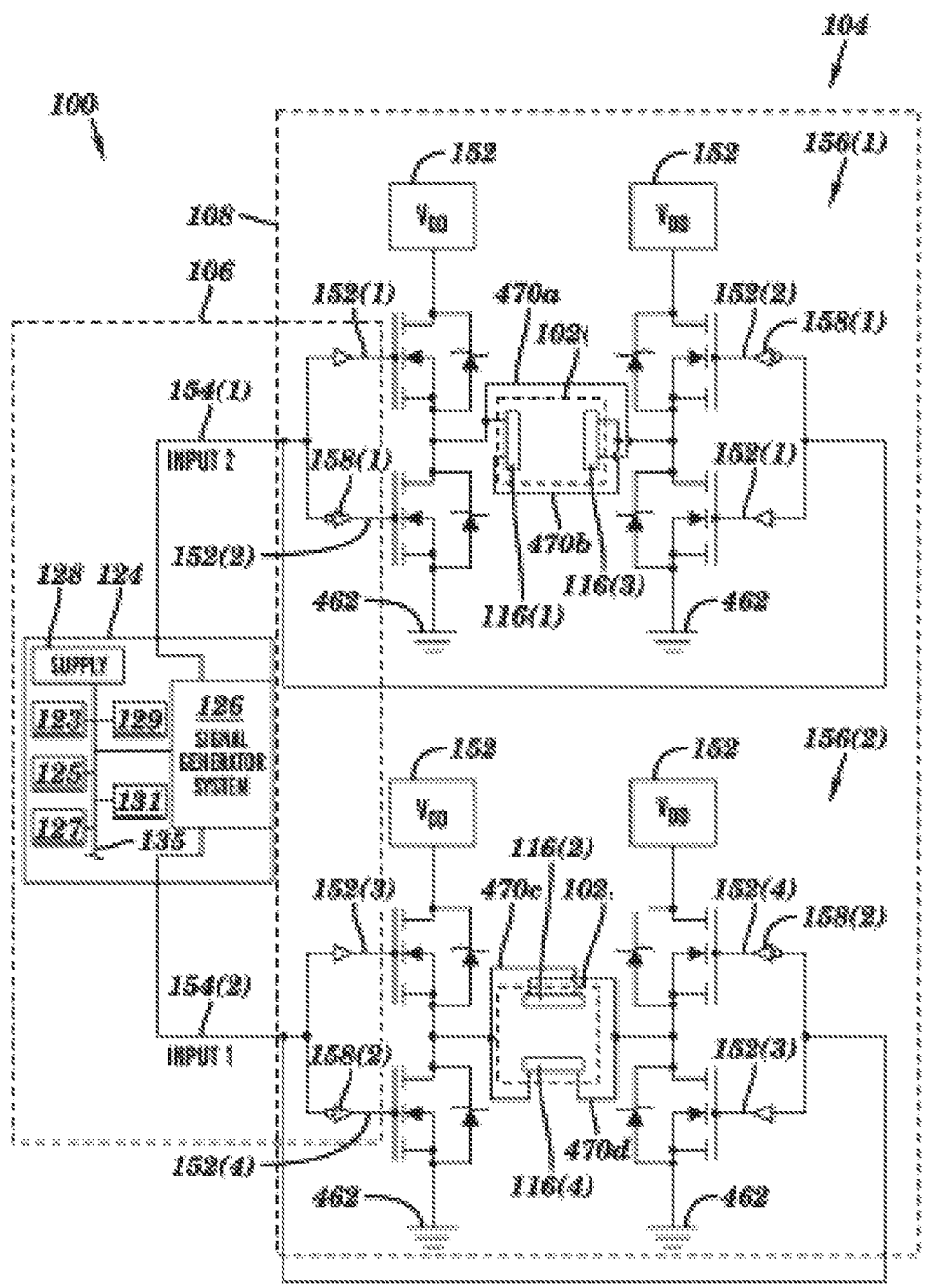
FIG. 1A is a partial block diagram, partial circuit diagram, and a partial end view of an example of a resonant actuator system with a full bridge driving system that improves velocity control and power efficiency.
Figure 1B:
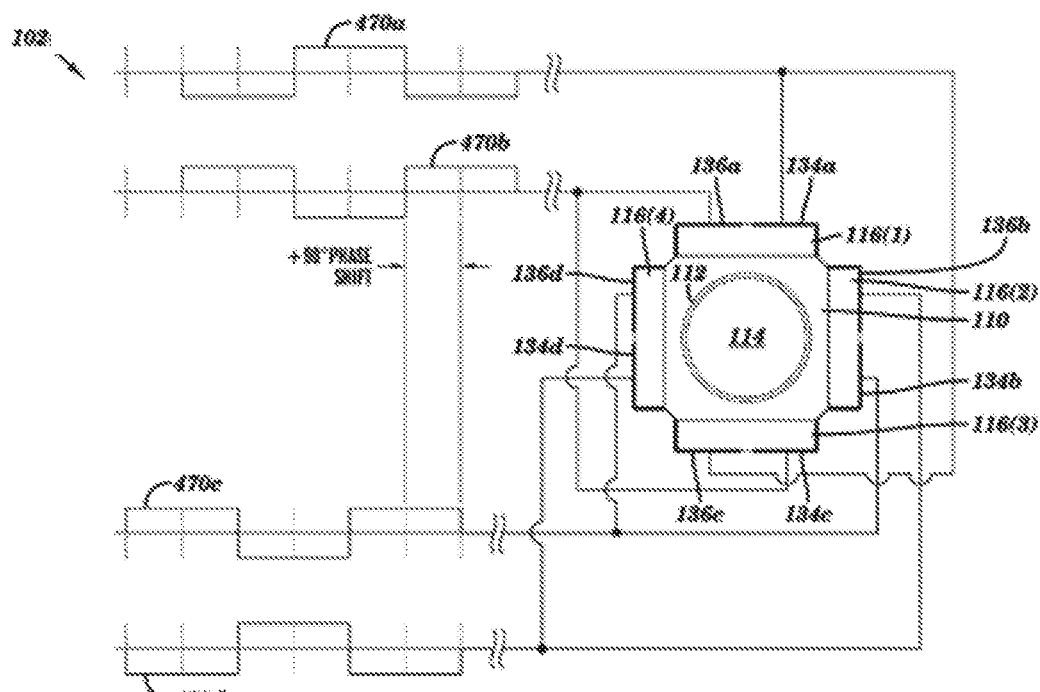
FIG. 1B is a partial circuit diagram, and a partial end view of the example of the resonant actuator system with a linear actuator device driven by exemplary representation of drive signals from the full bridge driving system of FIG. 1A.

An example of an at least partially resonant actuator system 100 with PVC (pseudo voltage control) velocity control is illustrated in FIGS. 1A and 1B. In this example, the resonant actuator system 100 includes an actuator device 102 and a driving system 104 comprising an actuator controller system 106 and a driver assembly 108, although the system could comprise other types and/or numbers of systems, devices, components, and/or other elements in other configurations. This technology provides a number of advantages including providing a faster and more power efficient operational velocity control of an at least partially resonant actuator system.

Referring more specifically to FIG. 1B, the actuator device 102 generates a force to move a load, such as an optical lens by way of example only, in a linear direction at a controlled velocity, although the actuator device 102 can move other types of loads in other directions. The actuator device 102 in this embodiment is the same in structure and operation as the linear actuator device illustrated and disclosed in U.S. patent application Ser. No. 12/228,923, filed Aug. 18, 2008 for, "Reduced-Voltage, Linear Motor Systems and Methods Thereof," which is herein incorporated by reference, although other types of actuator devices can be used.

The actuator device 102 includes an element 110 with a threaded passage 112, a threaded shaft 114, piezoelectric members 116(1)-116(4), further including "L" shaped electrodes 134a-d and 136a-d, respectively, as described in more detail below with respect to FIG. 1B, although the actuator device 102 can include other types and/or numbers of systems, devices, components, and/or other elements in other configurations. The inner passage of the element 110 is threaded throughout its length, although the passage could have other configurations, such as being partially threaded. The threaded shaft 114 is screwed into the threaded passage 112 of the element 110 for rotation about and linear movement along the passage at a controlled velocity.

Each of the piezoelectric members 116(1)-116(4) comprises multiple layers of piezoelectric material, although other types and/or numbers of vibratory elements could be used. Each of the piezoelectric members 116(1)-116(4) changes length when subjected to a voltage differential. The piezoelectric members 116(1) and 116(3) are connected to substantially opposing sides of element 110 about threaded passage 112 and the piezoelectric members 116(2) and 116(4) also connected to substantially opposing sides of element 110 about threaded passage 112, although other numbers of vibratory members connected in other configurations could be used. The electrodes 134a-d and 136a-d are each coupled to one of the piezoelectric members 116(1)-116(4), as described below with reference to FIG. 1B, to apply the voltage differential across the piezoelectric members 116(1)-116(4) based on applied drive signals 470a-470d (whose shape here is for general illustration purposes only) and generated from input drive signals 152(1)-152(4) (also referred to herein as input driving signals 152(1)-152(4)), although other manners of coupling other types and/or numbers of drive signals to the vibratory members can be used. Drive signals in accordance with examples of this technology are illustrated and described with reference to FIGS. 2-5C herein.

Referring to FIG. 1B, the applied drive signals 470a-d are illustrated and shown being transmitted to respective piezoelectric members 116(1)-116(4) that bend the element 110 back and forth along a first plane in response to the applied drive signals 470a-d. The first applied drive signal 470a is an approximately square-wave voltage signal that is about 180 degrees out of phase from the second applied drive signal 470b, which is also an approximately square-wave voltage signal.

Similarly, the third applied drive signal 470c is an approximately square-wave voltage signal that is about 180 degrees out of phase from the fourth applied drive signal 470d, which is also an approximately square-wave voltage signal. The cyclical, offset excitation of the piezoelectric members 116(1) and 116(3) and the piezoelectric members 116(2) and 116(4) causes a corresponding cyclic and/or orthogonal bending motion of the element 110 back and forth in the first and second planes. This bending motion of the element 110 causes the threaded shaft 114 to rotate and translate in the direction along the length of the threaded passage 112 at a velocity based on the applied drive signals.

The first and second applied drive signals 470a,b are transmitted through electrical traces that are attached via solder to "L" shaped electrodes 134a and 136a on the first member 116(1) and also to respective "L" shaped electrodes 134c and 136c, on the third member 116(3). The third and fourth applied drive signals 470c,d are transmitted through electrical traces that are attached via solder to respective "L" shaped electrodes 134b and 136b on the second member 116(2) and also to respective "L" shaped electrodes 134d and 136d on the fourth member 116(4). By way of example only, the "L" shaped electrodes 134a-d and 136a-d shown in FIGS. 1A and 1B can be located on longer edges of the members 116(1)-116(4).

The actuator controller system 106 in the driving system 104 in this embodiment is the same in structure and operation as, for example, the actuator controller system illustrated and disclosed in U.S. patent application Ser. No. 12/228,923, filed Aug. 18, 2008 for, "Reduced-Voltage, Linear Motor Systems and Methods Thereof" which is herein incorporated by reference, except as illustrated and described herein, although other types of actuator controller systems can be used. The actuator controller system 106 includes an actuator processing device 124 with a signal generator system 126, a supply voltage or voltage source 128, although the actuator controller system 106 can include other types and/or numbers of systems, devices, components, and/or other elements in other configurations.

The actuator processing device 124 in the actuator controller system 106 includes a processor 123, a memory storage device 125, user input device 127, a display 129, a communication interface system 131, and the signal generator system 126 which are coupled together by a bus or other link 135, although other types and/or numbers of systems, devices, components, and/or other elements in other configurations can be used and the signal generator system 126 can be separate from the actuator processing device 124. The processor 123 executes a program of stored instructions for one or more aspects of examples of this technology as illustrated and described herein, including for increasing velocity or speed and decreasing power consumption of the actuator device 102.

According to some examples, actuator processing device 124 includes a phase shifting circuit to generate driving signals 154(1) and 154(2) for a full bridge. The actuator processing device 124 is configured to adjust the driving signals 154(1) and 154(2) as illustrated and described by way of the examples.

The memory storage device 125 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium having instructions stored thereon for performing various steps of the invention, which is read from and/or written to by a magnetic, optical, or other reading and/or writing system that is coupled to the processor 123 can be used for the memory storage device 125.

Memory 125 includes an n-bit register (also referred to herein as an accumulator or a register accumulator) to store a value of the duty cycle used to determine a sequence of full bridge outputs. The value of n can be variable depending upon a resolution in the value of the duty cycle required. For example, n-bit register can be an 8-bit register although other values of n can also be used, as known to one skilled in the art. Memory 125 can also store the full bridge sequence determined by the actuator processing device 124.

The user input device 127 is used to input selections to be utilized and/or stored in the memory 125, although the user input device could be used to input other types of data and actions and interact with other elements. The user input device 127 can include a computer keyboard and a computer mouse, although other types and/or numbers of user input devices can be used.

The display 129 is used to show the graphical user interface for inputting requests, although other types of information can be displayed in other manners. The display 129 can include a computer or mobile communications device display screen, such as a CRT or LCD screen, although other types and/or numbers of displays such as a light emitting diode (LED) could be used.

The communication interface system 131 is used to operatively couple and communicate between the actuator processing device 124 and the driver assembly 108 along with the actuator device 102 via one or more communications networks, although other types and/or numbers of connections, configurations, and communication manners can be used.

The signal generator system 126 generates at least two low-voltage driving signals 154(1) and 154(2) which are provided to full bridge drive systems 156(1) and 156(2) in driver assembly 108 in response to instructions from the actuator processing device 124, although the signal generator system could generate other types and/or numbers of signals which are provided to other types and/or numbers of systems or devices. Inverters 158(1) and 158(2) are coupled between the signal generator system 126 and the driver assembly 108 and each receive the low-voltage driving signals 154(1) and 154(2), respectively, which are inverted to generate additional input drive signals 152(2) and 152(4), respectively. The low voltage and inverted input drive signals 152(1), 152(2), 152(3), and 152(4) are input through the driver assembly 108 to drive the four piezoelectric members 116(1), 116(2), 116(3), and 116(4), although other types and/or numbers of signals could be generated and used.

The voltage source 128 in the actuator controller system 106 is a battery supply system that supplies power to run the actuator processing device 124 and the driver assembly 108 (for ease of illustration the coupling to each $V_{DD}$ of the driver assembly 108 is not shown), although other types and/or numbers of power supplies which supply power to types and/or numbers of system, devices, and components can be used. By way of example only, voltage source 128 can be a battery in, for example, a cell phone, a camera, or a PDA.

Although an embodiment of the actuator controller system 106 with the actuator processing device 124 is described and illustrated herein, each of these systems could be implemented on any suitable computer system or device or an application specific integrated circuit or other programmable entity. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, application specific integrated circuits, digital signal processors, and microcontrollers, programmed according to the teachings of the examples, as described and illustrated herein, and as will be appreciated by those ordinary skill in the art.

In addition, two or more computing systems or devices can be substituted for any one of the systems in any embodiment. Accordingly, principles and advantages of distributed processing, such as redundancy and replication also can be implemented, as desired, to increase the robustness and performance of the devices and systems of the examples. The examples may also be implemented on computer system, systems, or other devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the present invention as described and illustrated by way of the examples herein, as described herein, which when executed by a processor, cause the processor to carry out the steps necessary to implement the methods of the examples, as described and illustrated herein.

The driver assembly 108 in this embodiment is the same in structure and operation as the driver assembly illustrated and disclosed in U.S. patent application Ser. No. 12/228,923, filed Aug. 18, 2008 for, "Reduced-Voltage, Linear Motor Systems and Methods Thereof" which is herein incorporated by reference, although other types of driver assemblies can be used. The driver assembly 108 is a full bridge driver which includes full bridge drive systems 156(1) and 156(2) coupled to the voltage source 128, although the driver assembly 108 can include other types and/or numbers of systems, devices, assemblies, and components in other configurations.

By way of example only, the full bridge drive systems 156(1) and 156(2) amplify and split the input low-voltage driving signals 154(1) and 154(2), respectively into applied drive signals 470a-b and 470c-d, respectively. The first and second applied drive signals 470a,b are transmitted to piezoelectric members 116(1) and 116(3) via a flex circuit (not shown) to drive the members piezoelectric members 116(1) and 116(3). The third and fourth applied drive signals 470c,d are transmitted to piezoelectric members 116(2) and 116(4) via the flex circuit to drive the piezoelectric members 116(2) and 116(4).

According to some examples, using a full bridge drive system 156(1) and 156(2) to transmit the applied drive signals 470a-d to their respective piezoelectric members 116(1)-116(4) allows for the driving system 104 to be commonly grounded at ground point 462. The electrodes 134a-d and 136a-d are floating relative to common ground and are driven independently, which eliminates a need for soldering a common ground wire to the element 110, as is typically required in linear motor systems. Eliminating the common ground wire soldered to the element 110 reduces the time and cost it takes to make a linear motor system, e.g., the actuator device 102.

The driver assembly has four outputs to provide the drive signals 470(a)-470(d) to the actuator device 102, although other types and/or numbers of outputs which provide other types and/or numbers of signals, such as sinusoidal shaped-signals by way of example only, can be used.

With reference to FIGS. 1A and 1B, according to some examples, the first piezoelectric member 116(1) and the third piezoelectric member 116(3) comprise a first pair of opposing members that operate together; and the second piezoelectric member 116(2) and the fourth piezoelectric member 116(4) comprise a second pair of opposing members that operate together. The applied drive signals 470a,b provided to the first pair of opposing members are phase shifted about 90 degrees relative to the applied drive signals 470c,d provided to the second pair of opposing members to cause the threaded shaft 114 to rotate and translate in the direction along a first axis of rotation. A positive 90 degree phase shift, will produce a positive or forward translation of the threaded shaft 114, where a negative 90 degree phase shift will produce a negative or backward translation of the threaded shaft 114. According to some examples, a frequency of applied drive signals 470a-d is substantially the same as the first bending mode resonance of the actuator device 102. While certain electrical signals and phase shifts are described by way of examples herein, it is contemplated that other drive signals 470a-d can be implemented.

Figure 2:
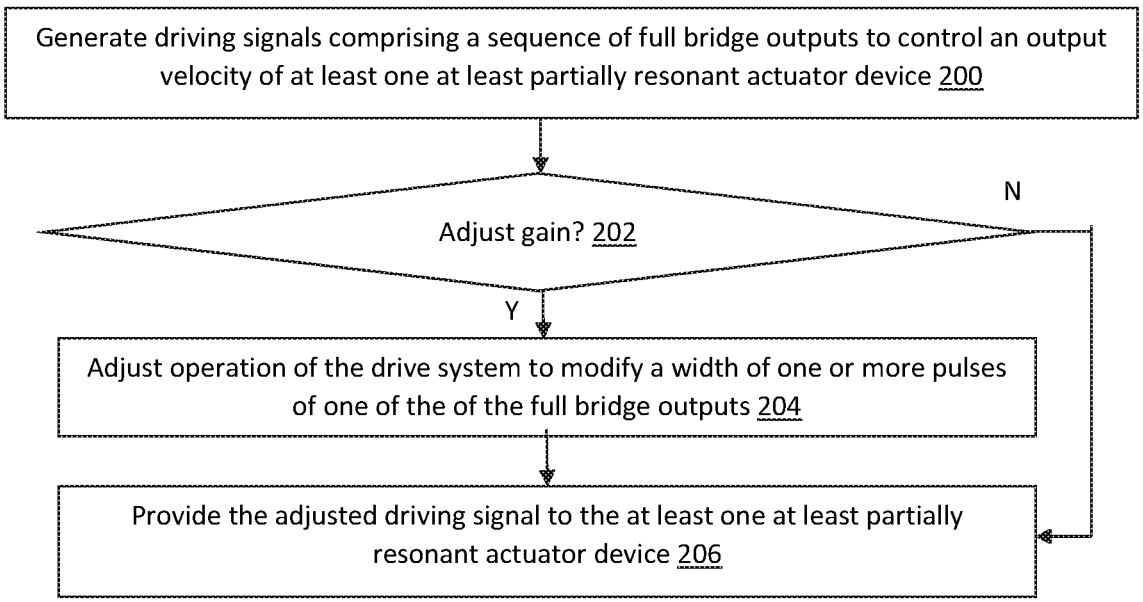
FIG. 2 is a flowchart of an example of a method for controlling velocity of an at least partially resonant actuator system.

Referring to FIG. 2, an example of a method for regulating velocity while reducing power consumption of resonant actuator systems 100 will now be described. In this example, in step 200 the actuator controller system 106 may control the driving assembly 108 to generate driving signals comprising a sequence of full bridge outputs to control an output velocity of the actuator device 102.

Figure 3:
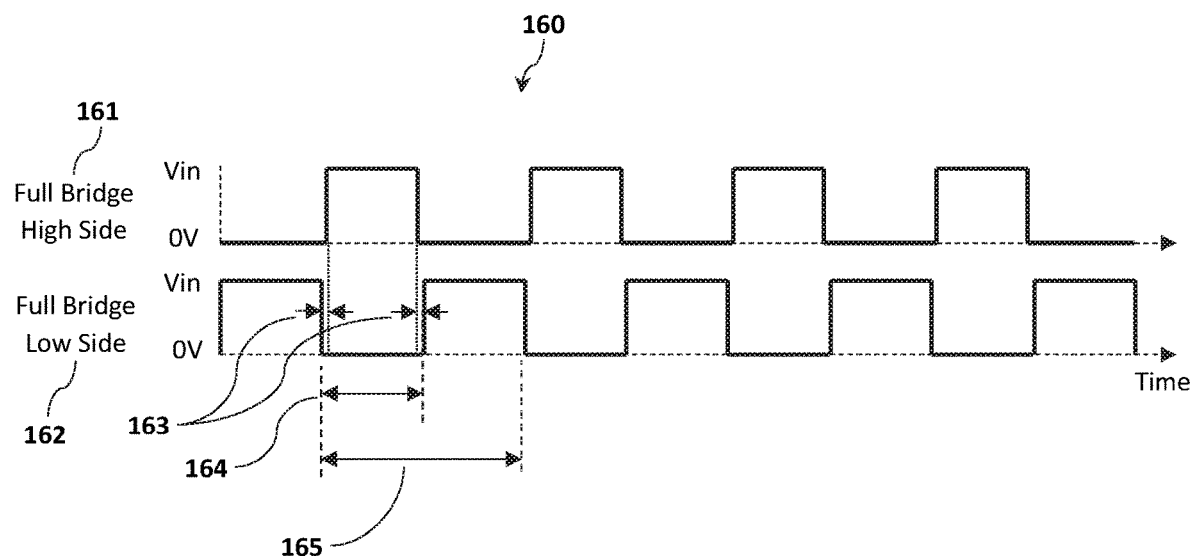
FIG. 3 is a timing diagram of an example of a single phase of a full bridge waveform for 100% gain with dead time applied between the falling edge of one side and the rising edge of the other side.

Referring to FIG. 3, a timing diagram of an example of a single phase of a full bridge waveform for 100% gain with dead time applied between the falling edge of one side and the rising edge of the other side that the actuator controller system 106 may control the driving assembly 108 to generate is illustrated. In this example, for a given voltage level and pulse frequency for the driving signals, maximum energy is injected into to the resonant actuator device 102 when the pulse width 164 of both the high side 161 and low side 162 of full bridge drive signals 160 is close to ½ the pulse period 165. The pulse width of the low side 162 is always slightly wider than that of the high side 161 in order to reduce the losses associated with driving the capacitive load of the actuator. This difference in time between the falling edge of one side and the rising edge of the other side 163 is also referred to as dead time and its use is described by way of example in U.S. Pat. No. 8,304,960.

Referring back to FIG. 2, in step 202 the actuator controller system 106 may determine if an adjustment to the gain of the driving signals is needed. By way of example only, the adjustment to the gain may be in response to a received request for an adjustment or in response to a feedback loop to maintain or adjust a velocity of the actuator device 102 for a load, although other triggers for determining when to adjust gain may be used. If in step 202 the actuator controller system 106 determines an adjustment to the gain of the driving signals is needed, then the Yes branch is taken to step 204.

In step 204, the actuator controller system 106 may adjust the operation of the drive assembly 108 to modify a width of one or more pulses of one of the full bridge outputs for a first range of gain or another one of the full bridge outputs for a second range of the gain to less than fifty percent of a period of the fixed drive frequency of the driving signals to achieve a new gain. By way of example, the actuator controller system 106 may adjust the operation of the drive assembly 108 to adjust the width of the one or more pulses of one of the full bridge outputs to less than fifty percent of the period of the fixed drive frequency of the driving signals; and maintain the width of the one or more pulses of the another one of the full bridge outputs for a new gain in the first range between 100% and 50% in this example. By way of another example, the actuator controller system 106 may adjust the operation of the drive assembly 108 to adjust the width of the one or more pulses of one of the full bridge outputs to zero and adjust the width of the another one or more pulses of one of the full bridge outputs to less than fifty percent of the period of the fixed drive frequency of the driving signals. Various examples of these adjustments are illustrated and described in further detail below. In some examples of this PVC method, the width of the one or more pulses of one of the full bridge outputs or of the another one of the full bridge outputs is adjusted to between about fifteen percent to about fifty percent of the period of the fixed drive frequency of the driving signal to stay within an operational velocity range for the resonant actuator device 102, although other ranges can be used depending on the resonant actuator device, the load and the sliding friction.

Figure 4:
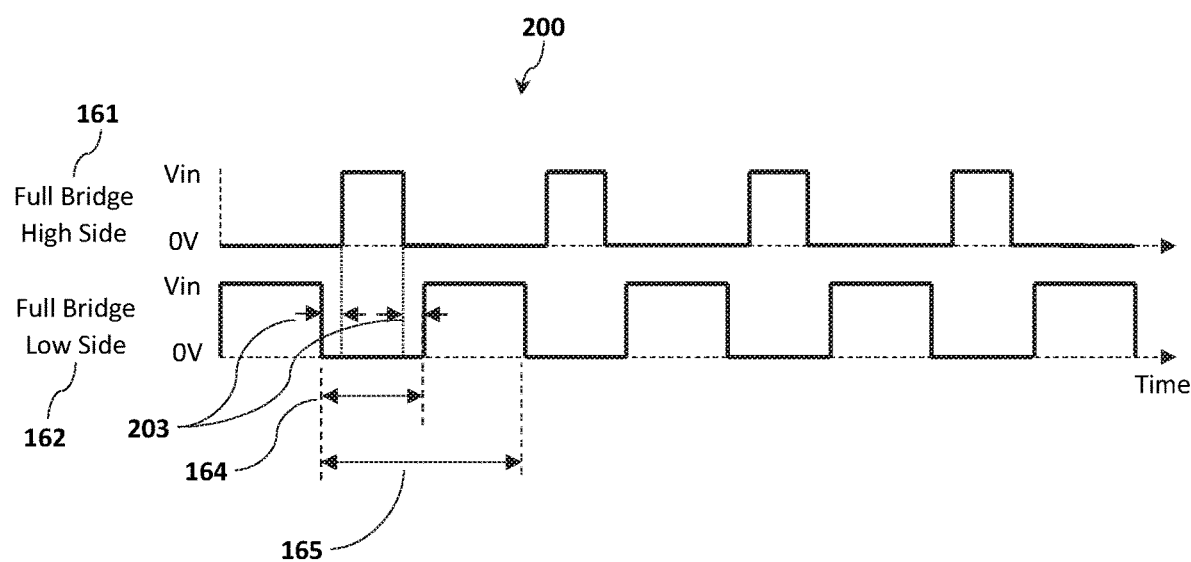
FIG. 4 is a timing diagram of an example of a single phase of a full bridge waveform in which a dead time has been increased to reduce excitation energy that may be delivered to an at least partially resonant actuator system.

Referring to FIG. 4, a timing diagram 200 of an example of the actuator controller system 106 adjusting the operation of the drive assembly 108 to modify a width of one or more pulses of one of the full bridge outputs for a new gain is illustrated. In this example, a single high side 161 of a full bridge waveform has dead time increased to reduce excitation energy that may be delivered to the actuator device 102 to reduce gain somewhere between 100% and 50% in the first range, although other ranges could be used. As gain is reduced to the desired new gain somewhere between 100% toward 50%, the pulse width of the low side 162 remains at close to ½ the pulse period and the pulse width of the high side is proportionally reduced from somewhere between ½ the pulse period to 0. In this example, this pulse width reduction is achieved by the actuator controller system 106 adjusting the operation of the drive assembly 108 to increase the dead time 203. That is, increasing the delay between the falling edge of the low side and the rising each of the high side and symmetrically the falling edge of the high side and the rising edge of the low side. In this way the high side pulse remains centered over the low side pulse.

Figure 5:
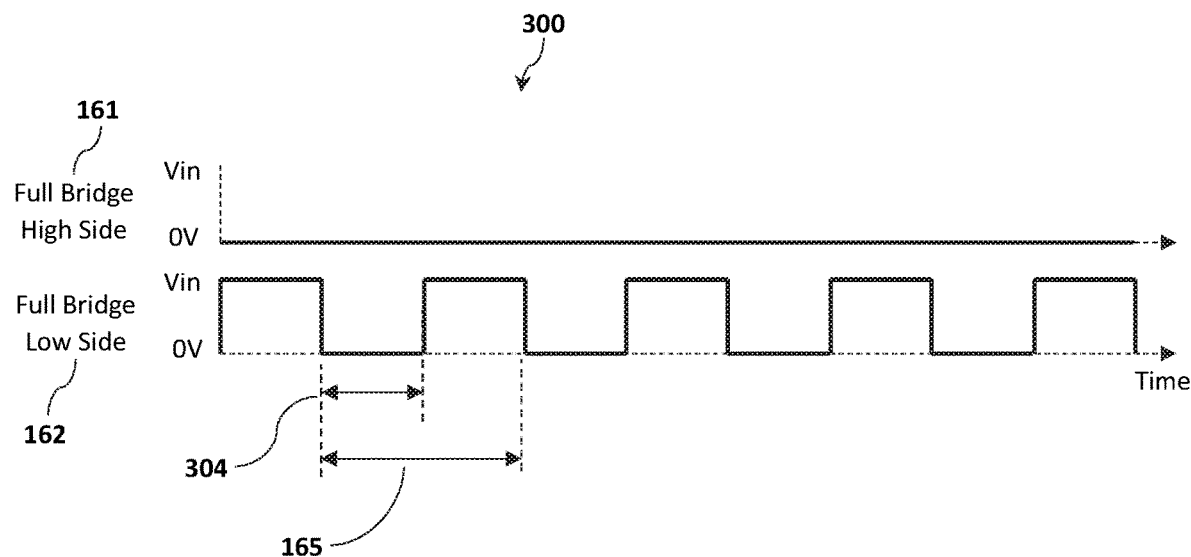
FIG. 5 is a timing diagram of an example of a single phase of a full bridge waveform in which a dead time has been increased to a point where a high side is no longer being switched.
Figure 6:
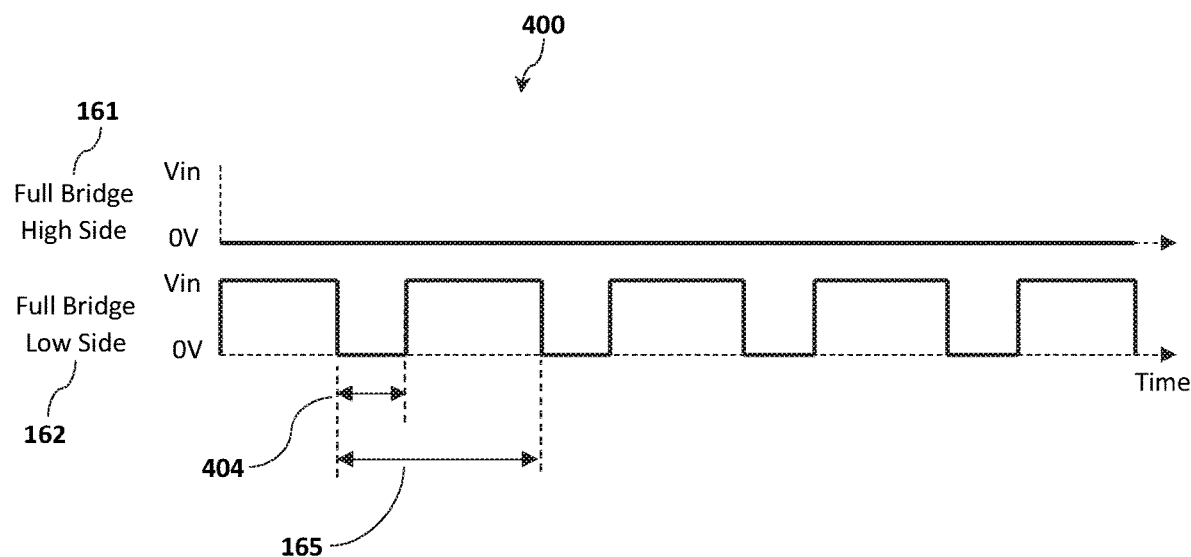
FIG. 6 is a timing diagram of an example of a single phase of a full bridge waveform in which energy that may be delivered to the at least partially resonant actuator system is further reduced by reducing a pulse width of a low side.

Referring to FIGS. 5-6, timing diagrams 300 and 400 of examples of the actuator controller system 106 adjusting the operation of the drive assembly 108 to generate a single phase of a full bridge waveform in which dead time has been increased to a point where a high side 161 is no longer being switched are illustrated. In these examples, as the gain is further reduced by the actuator controller system 106 adjusting the operation of the drive assembly 108 to the new gain target between 50% toward 0% the high side 161 is no longer being activated and is at zero while the pulse width of the low side 162 is proportionally reduced somewhere between ½ the pulse period 304 to near zero depending on the new gain target.

Figure 7A:
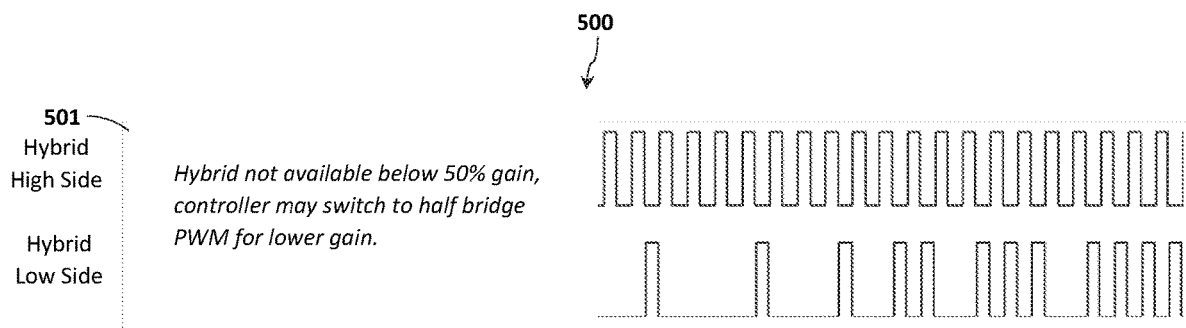
FIG. 7A is a timing diagram of a prior art example of a single phase of a full bridge waveform as a function of required motor gain to demonstrate how low side pulses were generated using a Hybrid method.

Referring to FIG. 7A, a timing diagram 501 of a prior art example of a single phase of a full bridge waveform as a function of required motor gain to demonstrate how low side pulses were generated using the Hybrid method is illustrated. As described by way of example in U.S. Pat. No. 8,299,733 and as illustrated in FIG. 7A, the Hybrid method adjusts the rate at which it delivers a low side pulse according to the required gain. Below 50% gain, the low side is not used, and the controller may further regulate gain by adjusting the pulse width of the high side.

Figure 7B:
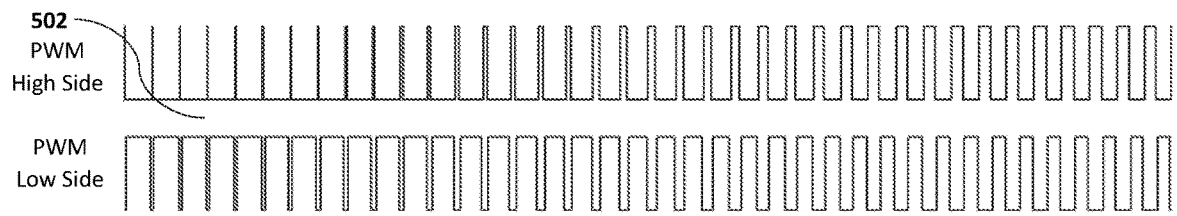
FIG. 7B is a timing diagram of a prior art example of a single phase of a full bridge waveform as a function of required motor gain to demonstrate how pulse width was adjusted using an example of a PWM method.

Referring to FIG. 7B, a timing diagram 502 of a prior art example of a single phase of a full bridge waveform as a function of required motor gain to demonstrate how pulse width was adjusted using an example of a PWM method is illustrated. As described by way of example in U.S. Pat. No. 8,450,905 and as illustrated in FIG. 7B, the PWM method linearly reduces the pulse width of both the high side and the low side as gain is reduced.

Figure 7C:
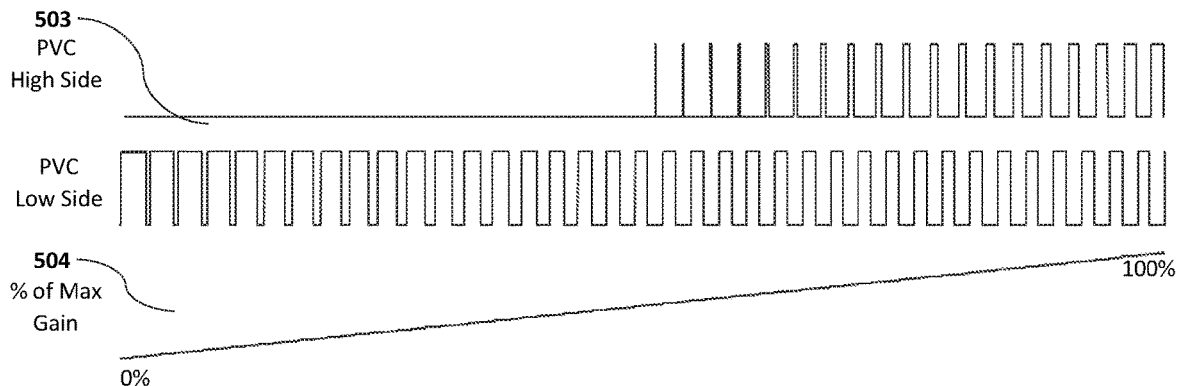
FIG. 7C is a timing diagram of an example of a single phase of a full bridge waveform as a function of required motor gain to demonstrate how dead time and pulse width are adjusted using an example of a PVC method as well as a gain curve that applies to FIGS. 7A-7C.
Figures 7D, 8:
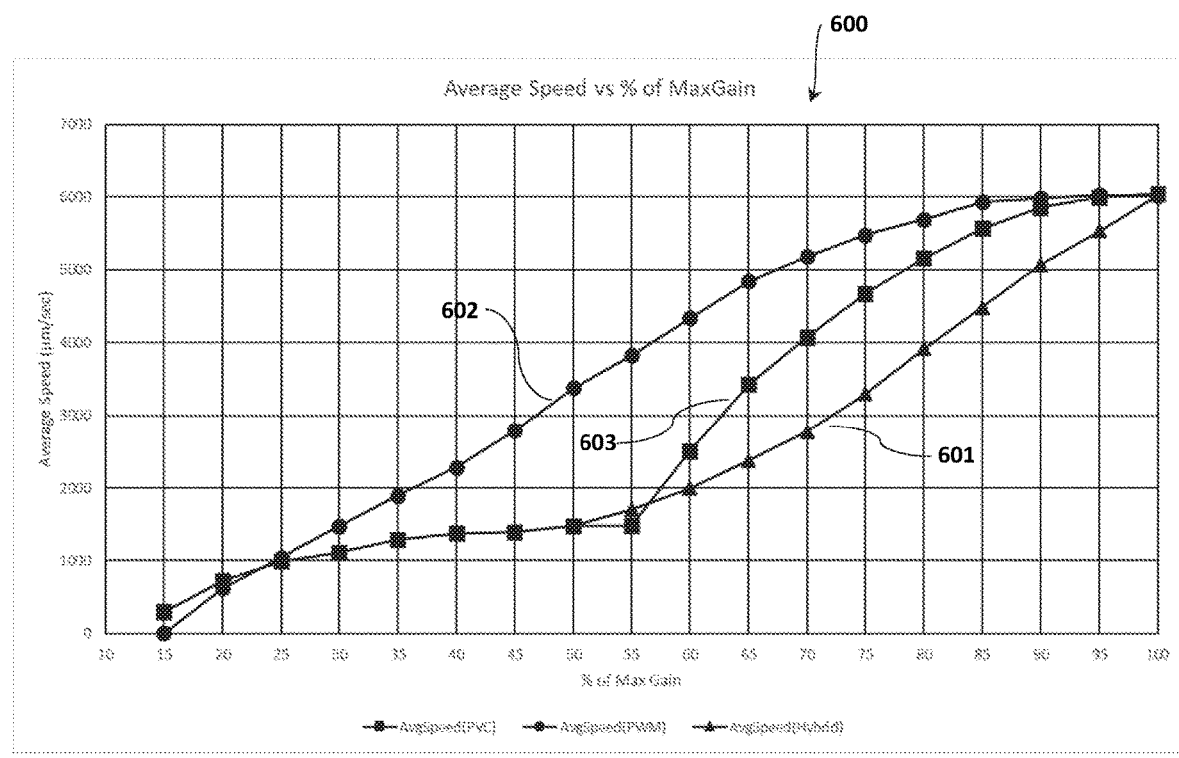
FIG. 7D is a table on an example which illustrates how the pulse width of the high and low sides a full bridge waveform varies with gain using the PVC method.
FIG. 8 is a graph of an example of average measured speed of a moderately loaded stage as a function of motor gain for a Hybrid method, a PWM method, and an example of a PVC method.

In contrast to these prior approaches, FIG. 7C illustrates a timing diagram 503 of an example of a single phase of a full bridge waveform as a function of required motor gain to demonstrate how dead time and pulse width are adjusted as discussed in the examples of this technology for the PVC method. Additionally, a gain curve that applies to FIGS. 7A-7C is illustrated. FIG. 7D illustrates an example in tabular form 505 the relationship between gain and the pulse width (in % of pulse period) of the high side and the load side if a single phase of a full bridge waveform.

Referring back to FIG. 2, following step 204 or if back in step 202 the actuator controller system 106 determines an adjustment to the gain of the driving signals is needed and the No branch was taken, then in step 206 the driving assembly 108 is configured to provide the adjusted driving signal to the resonant actuator device 102.

Referring to FIG. 8, a graph of an example of average measured speed of a moderately loaded stage as a function of motor gain for the Hybrid method, the PWM method, and the PVC method in accordance with examples of this technology is illustrated. In this graph 600, to illustrate the relationship between gain and speed for a moderately loaded stage on the resonant actuator device 102, the Hybrid method (represented by line 601) was driven from 50% to 100% gain in 5% steps while the PWM method (represented by line 602) and the PVC method in accordance with examples of this technology (represented by line 603) were driven from 15% to 100% gain in 5% steps.

In this example, for velocities for resonant actuator systems that require 100% or nearly 100% gain, there is no difference in power efficiency for these methods (i.e. the examples of the PVC method in accordance with examples of this technology, the PWM method, and the Hybrid method). However, as the required gain goes down the power efficiency of the PVC method in accordance with examples of this technology increases while still being able to adjust rapidly to changes in load and/or dynamic friction.

Figure 9:
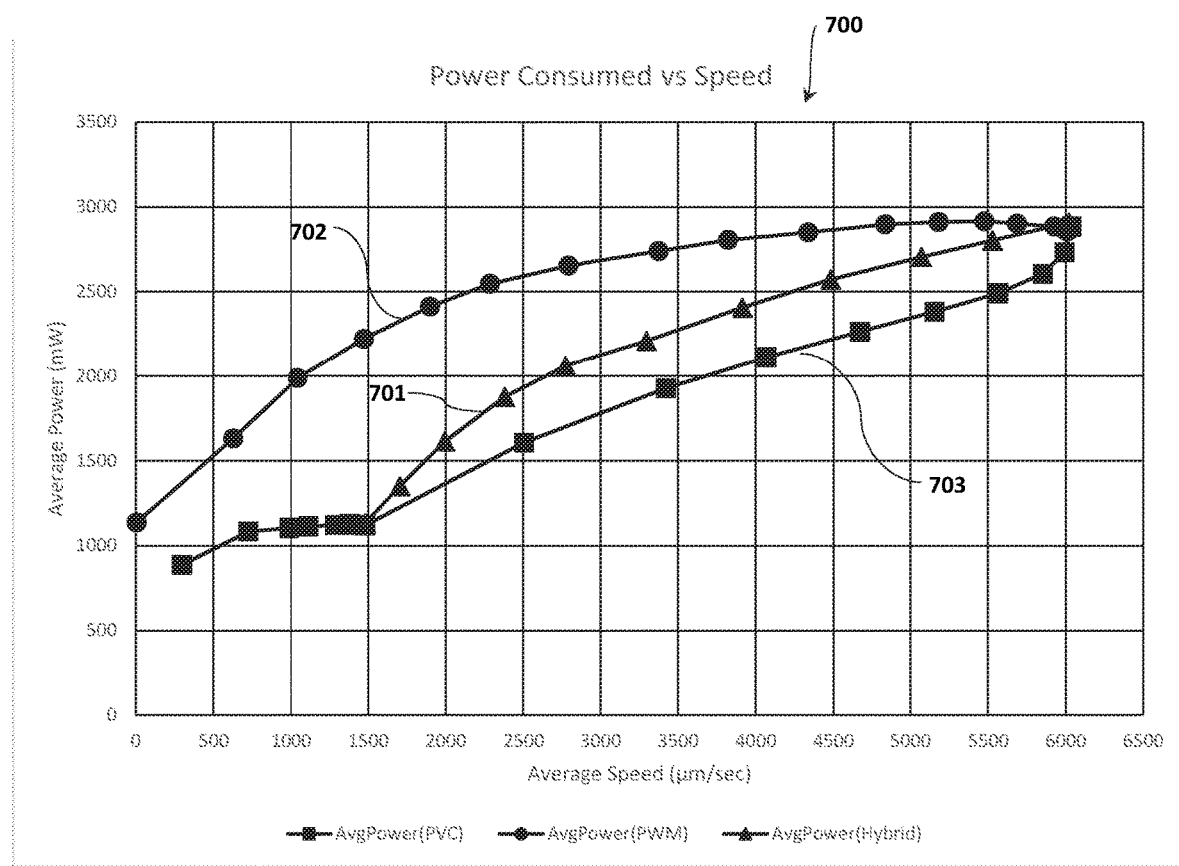
FIG. 9 is a graph of average measured power consumed by a moderately loaded stage as a function of speed for a Hybrid method, a PWM method, and an example of a PVC method.

Referring to FIG. 9, a graph 700 of average measured power consumed by a moderately loaded stage as a function of speed for the Hybrid method, the PWM method, and an example of the PVC method in accordance with examples of this technology is illustrated. In this example, to illustrate the power efficiency of the PVC method in accordance with examples of this technology, over the Hybrid method and the PWM method, a moderately loaded stage was driven by the resonant actuator device 102 with increasing gain levels and the average speed and power levels were recorded. In this example, from speeds of ~1.5 mm/sec to 6 mm/sec, near the maximum speed for the applied voltage, the PVC method in accordance with examples of this technology (represented by line 703) consumed less power than the Hybrid method (represented by line 701) and PWM method (represented by line 702). At 1.5 mm/sec, PVC and Hybrid were similar, and both consumed less power than PWM.

Accordingly, as illustrated and described by way of the examples herein this technology provides faster and more power efficient operational velocity control of an at least partially resonant actuator system. In particular, examples of this technology, (referred to herein as the pseudo voltage control (PVC) method) achieve a more rapid change in actuator system velocity than the Hybrid method while being more power efficient than the PWM method.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
controlling, by a computing device, a driving system to generate driving signals comprising a sequence of full bridge outputs to control an output velocity of at least one at least partially resonant actuator device; and adjusting, by the computing device, operation of the drive system to modify a width of one or more pulses of one of the full bridge outputs for a first range of gain or another one of the full bridge outputs for a second range of the gain to less than fifty percent of a period of the fixed drive frequency of the driving signals to achieve a new gain, wherein the adjusted driving signal is provided to the at least one at least partially resonant actuator device.

2. The method as set forth in claim 1 wherein the adjusting further comprises:
adjusting the width of the one or more pulses of one of the full bridge outputs to less than fifty percent of the period of the fixed drive frequency of the driving signals; and
maintaining the width of the one or more pulses of the another one of the full bridge outputs.

3. The method as set forth in claim 1 wherein the adjusting further comprises:
adjusting the width of the one or more pulses of one of the full bridge outputs to zero; and
adjusting the width of the another one or more pulses of one of the full bridge outputs to less than fifty percent of the period of the fixed drive frequency of the driving signals.

4. The method as set forth in claim 1 wherein the first range of gain is between one hundred percent to fifty percent and the second range of gain is between fifty percent and zero percent.

5. The method as set forth in claim 1 wherein the adjusting the width of the one or more pulses of one of the full bridge outputs or of the another one of the full bridge outputs is between about fifteen percent to about fifty percent of the period of the fixed drive frequency of the driving signals.

6. The device as set forth in claim 1 wherein the adjusting the width of the one or more pulses of one of the full bridge outputs or of the another one of the full bridge outputs is between about fifteen percent to about fifty percent of the period of the fixed drive frequency of the driving signals.

7. A resonant actuator system comprising:
at least one at least partially resonant actuator device;
a driving system coupled to the at least one at least partially resonant actuator device;
a computing device coupled to the driving system, the computing device comprising memory comprising programmed instructions stored thereon and one or more processors configured to be capable of executing the stored programmed instructions to
control the driving system to generate driving signals comprising a sequence of full bridge outputs to control an output velocity of the at least one at least partially resonant actuator device; and
adjust operation of the drive system to modify a width of one or more pulses of one of the full bridge outputs for a first range of gain or another one of the full bridge outputs for a second range of the gain to less than fifty percent of a period of the fixed drive frequency of the driving signals to achieve a new gain, wherein the driving system is configured to provide the adjusted driving signal to the at least one at least partially resonant actuator device.

8. The device as set forth in claim 7 wherein for the adjust the drive system to modify a width of one or more pulses, the one or more processors are further configured to be capable of executing the stored programmed instructions to further comprises:
adjust the width of the one or more pulses of one of the full bridge outputs to less than fifty percent of the period of the fixed drive frequency of the driving signals; and
maintain the width of the one or more pulses of another one of the full bridge outputs.

9. The device as set forth in claim 7 wherein for the adjust the drive system to modify a width of one or more pulses, the one or more processors are further configured to be capable of executing the stored programmed instructions to further comprises:
adjust the width of the one or more pulses of one of the full bridge outputs to zero; and
adjust the width of the another one or more pulses of one of the full bridge outputs to less than fifty percent of the period of the fixed drive frequency of the driving signals.

10. The device as set forth in claim 7 wherein the first range of gain is between one hundred percent to fifty percent and the second range of gain is between fifty percent and zero percent.

11. A method of making a resonant actuator system, the method comprising:
providing a driving system configured to couple to at least one at least partially resonant actuator device;
coupling a computing device to the driving system, wherein the computing device comprises memory comprising programmed instructions stored thereon and one or more processors configured to be capable of executing the stored programmed instructions to:
control the driving system to generate driving signals comprising a sequence of full bridge outputs to control an output velocity of the at least one at least partially resonant actuator device; and
adjust operation of the drive system to modify a width of one or more pulses of one of the full bridge outputs for a first range of gain or another one of the full bridge outputs for a second range of the gain to less than fifty percent of a period of the fixed drive frequency of the driving signals to achieve a new gain, wherein the driving system is configured to provide the adjusted driving signal to the at least one at least partially resonant actuator device.

12. The method as set forth in claim 11 wherein for the adjust the drive system to modify a width of one or more pulses, the one or more processors are further configured to be capable of executing the stored programmed instructions to further comprises:
adjust the width of the one or more pulses of one of the full bridge outputs to less than fifty percent of the period of the fixed drive frequency of the driving signals; and
maintain the width of the one or more pulses of the another one of the full bridge outputs.

13. The method as set forth in claim 11 wherein for the adjust the drive system to modify a width of one or more pulses, the one or more processors are further configured to be capable of executing the stored programmed instructions to further comprises:
adjust the width of the one or more pulses of one of the full bridge outputs to zero; and
adjust the width of the another one or more pulses of one of the full bridge outputs to less than fifty percent of the period of the fixed drive frequency of the driving signals.

14. The method as set forth in claim 11 wherein the first range of gain is between one hundred percent to fifty percent and the second range of gain is between fifty percent and zero percent.

15. The method as set forth in claim 11 wherein the adjusting the width of the one or more pulses of one of the full bridge outputs or of the another one of the full bridge outputs is between about fifteen percent to about fifty percent of the period of the fixed drive frequency of the driving signals.

* * * * *